United States Patent [19]
Tomasicchio

[11] Patent Number: 5,879,638
[45] Date of Patent: Mar. 9, 1999

[54] FLUIDIZED BED REACTOR WITH GAS DISTRIBUTOR

[75] Inventor: George Tomasicchio, Milan, Italy

[73] Assignee: Dorr-Oliver Incorporated, Milford, Conn.

[21] Appl. No.: 543,624

[22] Filed: Oct. 16, 1995

[51] Int. Cl.$^6$ ............................................. B01J 8/18
[52] U.S. Cl. ..................... 422/143; 422/311; 110/245; 34/582; 34/585
[58] Field of Search ................................... 422/143, 311; 122/4 D; 110/245; 34/585, 582, 584

[56] References Cited

U.S. PATENT DOCUMENTS

| | | | |
|---|---|---|---|
| 3,508,341 | 4/1970 | Price | 422/143 |
| 3,998,929 | 12/1976 | Leyshon . | |
| 4,017,585 | 4/1977 | Angevine et al. . | |
| 4,073,064 | 2/1978 | Steever et al. . | |
| 4,083,929 | 4/1978 | Priestley . | |
| 4,085,516 | 4/1978 | Jukkola et al. . | |
| 4,106,210 | 8/1978 | Jukkola . | |
| 4,159,682 | 7/1979 | Fitch et al. . | |
| 4,202,774 | 5/1980 | Kos . | |
| 4,304,754 | 12/1981 | Jukkola . | |
| 4,314,967 | 2/1982 | Kwon et al. . | |
| 4,346,054 | 8/1982 | Löfgren et al. | 422/49 |
| 4,610,851 | 9/1986 | Colvert et al. | 422/310 |
| 5,316,735 | 5/1994 | Ivanov et al. | 422/143 |
| 5,328,720 | 7/1994 | Emken et al. | 427/213 |
| 5,395,595 | 3/1995 | Hämäläinen | 422/135 |
| 5,510,085 | 4/1996 | Abdually | 422/142 |

OTHER PUBLICATIONS

"Fluid Bed Combustion For Waste Incineration", Bulletin No. FS–3 REV 1990.

"Fluid Bed Combustion and Its Application To the Incineration Of Hazardous Waste", Aug. 7 to 12, 1988, Engineering Foundation on Hazardous Waste Management Technologies Mercersburg Academy, Mercersburg, PA, Technical Reprint No. 7755.

*Primary Examiner*—Christopher Kim
*Attorney, Agent, or Firm*—McCormick, Paulding & Huber

[57] ABSTRACT

An improved fluidized bed reactor having a reactor shell and at least one reactor subsystem within the shell, the reactor subsystem having a reaction chamber and a wall, the improvement comprising at least one fluidizing gas distributor associated with the reactor subsystem and positioned below the reaction chamber and supported by the wall, the distributor comprising a top portion, a bottom portion, and a sidewall contiguous with the top and bottom portions to define an interior, a plurality of tuyeres attached to the top portion of the distributor to provide gaseous communication between the reaction chamber and the interior, and an inlet in the bottom portion for introducing a fluidizing gas to the interior.

16 Claims, 8 Drawing Sheets

FLUIDIZED BED REACTOR WITH GAS DISTRIBUTOR

BACKGROUND OF THE INVENTION

1. Field of the Invention

The present invention is related to fluidized bed reactors.

2. Problems to be Solved

Fluidized bed reactors are typically used to process waste or sewage. One type of conventional fluidized bed reactor incorporates a self supporting refractory brick arch or dome located below the fluidized bed. As used herein, the term "refractory" is defined as materials of the ceramic type, such as pre-fired clay. The refractory bricks are fitted with tuyeres to distribute gas to the fluidized bed. One problem with this type of reactor is that the weight of the refractory brick arch, and the weight of the bed when not fluidized, as well as the thermal stresses induced in the arch during operation, can impose large horizontal and radial forces on the reactor shell or walls. As such, it is the conventional practice to place a metal band, known as a "belly band", around the reactor to help contain the forces. However, the load carrying capability of the band is limited by size and material restrictions. Another problem is that the maximum size of the refractory brick arch, and therefore the maximum processing area, is limited by the load carrying capabilities of the bricks. When a certain diameter is attained, the arch will no longer be self supporting. Thus, the maximum achievable arch or dome diameter limits the diameter of the reactor. A further problem is that the refractory brick arch is pressurized with gas which passes through the tuyeres. The gas differential pressure across the tuyeres results in pressure on the refractory arch or dome. This pressure tends to lift the arch which is kept in its normal position by the weight of the arch or dome. Thus, such a problem limits the maximum allowable pressure of gas distributed by the tuyeres. Thus, the maximum achievable size of the arch bricks or the dome limit the maximum achievable pressure drop across the tuyeres. Furthermore, the gas distributed by the tuyeres tends to escape through any crevices or spaces between the bricks of the arch and enters the fluidized bed.

Another type of fluidized bed reactor incorporates metallic plates or dished-metal heads instead of a refractory brick arch. One problem with this type of reactor is that the maximum reactor diameter is limited by the maximum available size of the dished-head. The size of the dished-head is limited by acceptable stresses and expansions produced by variation in temperatures. Furthermore, as a consequence of warping and deformation resulting from the high process temperatures, it is difficult to ensure free expansion of the dished-head, as well as the integrity of mechanical seals as the gas differential pressure across the tuyeres increases. This problem becomes more acute as the size of the dished-head increases.

Bearing in mind the problems and deficiencies of conventional fluidized bed reactors, it is therefore an object of the present invention to provide a new and improved fluidizing gas distribution system for a fluidized bed reactor that does not limit the size of the fluidized bed reactor.

It is another object of the present invention to provide a new and improved fluidizing gas distribution system that can withstand relatively high pressure drops across the tuyeres.

It is a further object of the present invention to provide a new and improved fluidized bed reactor that substantially eliminates leakage of fluidizing gas into the fluid bed.

It is another object of the present invention to provide a new and improved fluidized gas distribution system that can freely expand and contract within a fluid bed reactor in response to variations in pressure and temperature within the reactor.

SUMMARY OF THE INVENTION

The above and other objects and advantages, which will be apparent to those skilled in the art, are achieved in the present invention which is directed to, in a first aspect, an improved fluidized bed reactor having a reactor shell and at least one reactor subsystem within the shell, the reactor subsystem having a reaction chamber and a wall, the improvement comprising at least one fluidizing gas distributor associated with the reactor subsystem and positioned below the reaction chamber and supported by a base portion of the wall, the distributor comprising a top portion, a bottom portion, and a sidewall contiguous with the top portion and the bottom portion thereby defining an interior, a plurality of tuyeres attached to the top portion of the distributor to provide gaseous communication between the reaction chamber and the interior, and an inlet in the bottom portion for introducing a fluidizing gas to the interior.

In a related aspect, a fluidized bed reactor comprising:

(a) a reactor shell and at least one reactor subsystem within the shell and having a reaction chamber, the reactor subsystem having a wall; and (b) at least one fluidizing gas distributor positioned beneath the reaction chamber, the distributor comprising (i) a top portion, a bottom portion and a sidewall contiguous with the top portion and the bottom portion to define an interior, the bottom portion having an inlet formed therein for introducing a fluidizing gas to the interior, (ii) a plurality of tuyeres attached to the top portion of the distributor for providing gaseous communication between the reaction chamber and the distributor interior, (iii) a nozzle in gaseous communication with the inlet in the bottom portion for introducing a fluidizing gas to the distributor interior, and (iv) a support structure having a first portion attached to the distributor and a second portion rigidly attached to the wall of the reactor chamber, the first portion being movable with respect to the second portion to allow the fluidizing gas distributor to move in response to variations in temperature and pressure within the reactor subsystem

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENTS

In describing the preferred embodiment of the present invention, reference will be made herein to FIGS. 1–11 B of the drawings in which like numerals refer to like features of the invention. Features of the invention are not necessarily shown to scale in the drawings.

Figure 1:
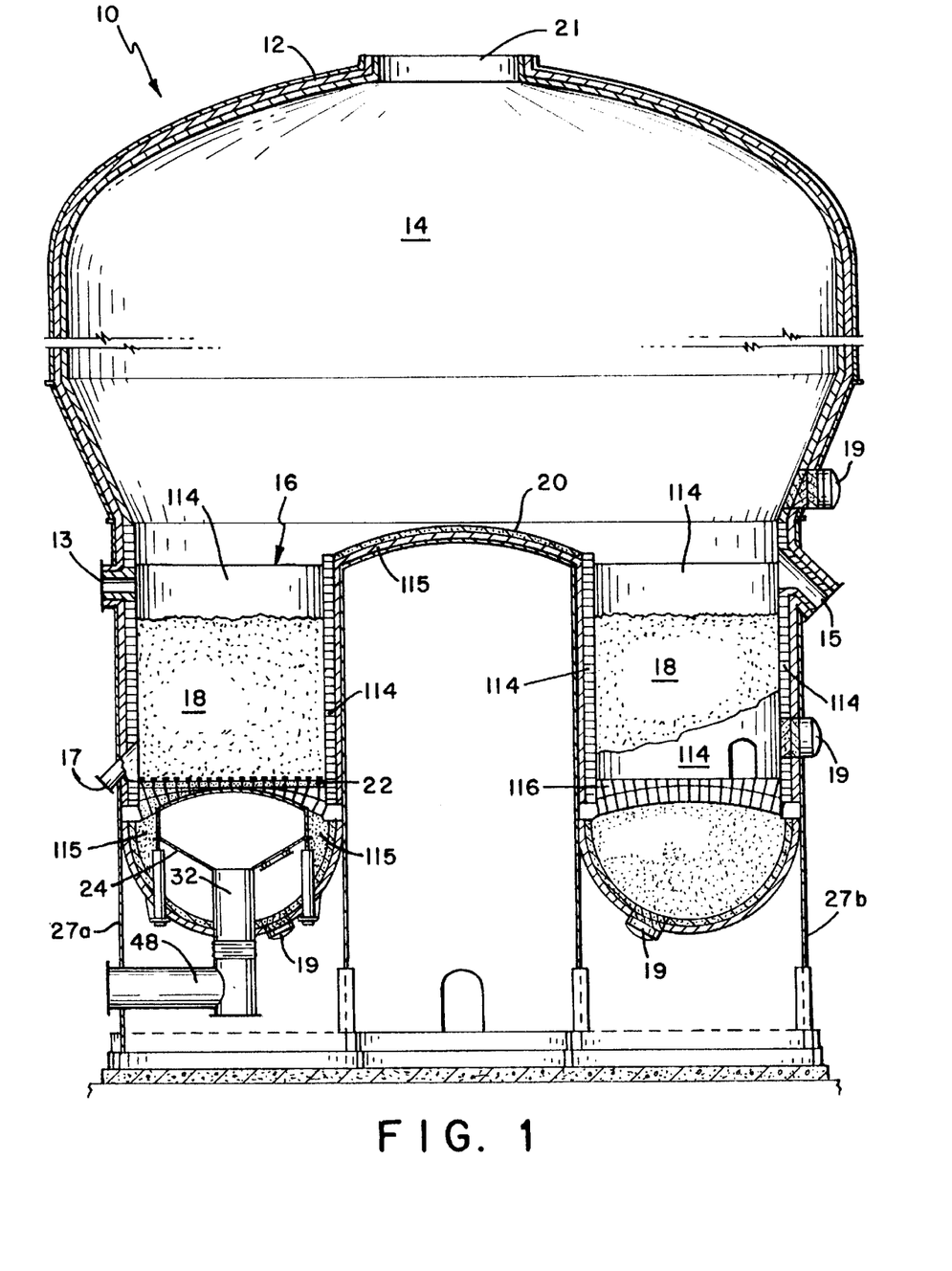
FIG. 1 is a sectional, elevational view of a fluidized bed reactor using the fluidizing gas distributor of the present invention.

Referring to FIG. 1, fluidizing bed reactor 10 comprises reactor shell 12 and a plurality of reactor subsystems. All reactor subsystems are identically constructed. Thus, in order to simplify the ensuing description, only reactor subsystem 27a will be described. Subsystem 27a comprises reaction chamber 16, particulate bed 18 contained within chamber 16, support member 22 and gas distributor 24 of the present invention. Particulate, having been reduced to a predetermined particle size, is fed into feed inlet 13 to form particulate bed 18. Processed particulate is withdrawn from outlet 15. Outlet 17 provides a discharge path for particulate of the particulate bed. Each entrance 19 comprises a manhole cover and is gaseously coupled to reactor shell 12 to provide entry into various parts of the reactor to facilitate maintenance thereof. Off-gases, which are typically comprised of gaseous and entrained solid constituents, pass through outlet 21. Dome 20 is coaxial with the axis of reactor 10 and is attached to all the reactor subsystems to provide structural support.

Figure 3:
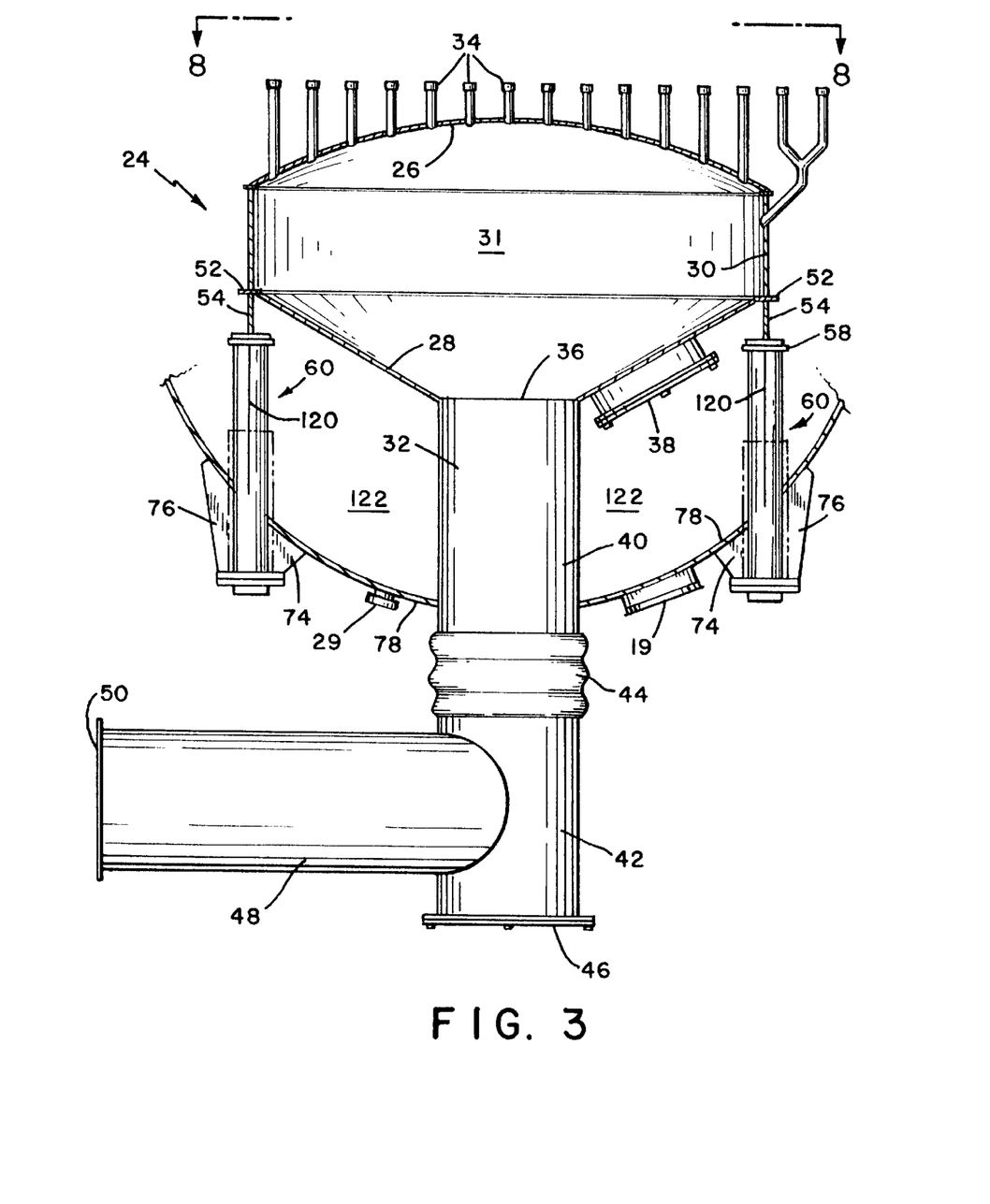
FIG. 3 is an elevational view of the fluidizing gas distributor of the present invention.

Referring to FIG. 3, fluidizing gas distributor 24 of the present invention comprises top portion 26, bottom portion 28 and sidewall 30 which is contiguous with top portion 26 and bottom portion 28. Top portion 26, bottom portion 28 and sidewall 30 form a chamber or vessel having interior region 31 for receiving fluidizing gases from nozzle 32. In a preferred embodiment, distributor 24 is fabricated from metal. Preferably, distributor 24 has a substantially spherical shape or a flattened spherical shape (bubble configuration). The pressure difference between interior 31 of distributor 24 and the surrounding space in reactor 10 is due to the pressure drop of the tuyeres only, regardless of the absolute pressure in reactor 10. The design pressure of distributor 24 is therefore dependent upon this relative pressure only. Thus, the pressure drop through the tuyeres is limited only by the mechanical resistance of distributor 24. Since distributor 24 is a closed vessel, except for the tuyeres 34 and inlet 36 (described below), there is no need for mechanically sealing distributor 24 from the reactor atmosphere or ambient. Different alloys may be used in fabricating distributor 24. If distributor 24 receives fluidizing gases having a significantly high pressure, then it is highly preferable that the alloy used to fabricate distributor 24 be able to withstand such high pressure.

Nozzle 32 will be discussed in detail below. A plurality of tuyeres 34 are gaseously coupled to corresponding openings formed in top portion 26. Tuyeres 34 extend upward from top portion 26 and are disposed within corresponding openings in support member 22 in order to transfer the fluidizing gases from interior region 31 into particulate bed 18.

Bottom portion 28 has a substantially conical shape and has an opening or inlet 36 formed in the apex thereof which is gaseously coupled to nozzle 32. Due to the conical shape of bottom portion 28, any solid particulate entering interior region 31 through tuyeres 34 falls through opening or inlet 36. Bottom portion 28 also has entrance 38 formed therein which comprises a manhole cover that is sealingly connected to bottom portion 28. Entrance 38 provides an entry way into interior region 31 so as to facilitate maintenance thereof. Sidewall 30 is perpendicularly attached to circumferential plate 52. Bottom portion 28 is supported by and attached to plate 52. The connections between sidewall 30 and plate 52, and bottom portion 28 and plate 52, are gas tight connections so as to prevent leakage therethrough of the fluidizing gas.

Support member 22 is substantially flat and has an appropriate thickness to support particulate bed 18. Support member 22 is attached to the reactor shell 12 and is positioned above fluidizing gas distributor 24. Thus, member 22 is supported by reactor shell 12. Preferably, member 22 is fabricated from castable refractory material. Such material is described in commonly owned U.S. Pat. No. 4,073,064, the disclosure of which is incorporated herein by reference. As shown in FIG. 1, castable insulation 115 is disposed between reactor shell 12 and distributor 24, and between support member 22 and top portion 26 of distributor 24.

Nozzle 32 is vertically oriented and comprises a first nozzle portion 40, second nozzle portion 42 substantially coaxial with first nozzle portion 40 and expansion joint 44 interposed between first and second nozzle portions 40 and 42, respectively, to allow each nozzle portion to move freely of the other portion over wide variations in temperature and pressure during operation of the fluidized bed reactor. Nozzle portion 40 movably extends through wall 78. Second nozzle portion 42 has opening 46 that effects drainage of the solid particulate matter that falls through opening 36. Nozzle portions 40 and 42 are preferably comprised of metal.

Fluidizing gas conduit 48 is gaseously connected to a corresponding opening in nozzle section 42. Conduit 48 is preferably fabricated from metal. Opening 50 of conduit 48 is gaseously coupled to a fluidizing gas source (not shown) which provides fluidizing gases that pass through conduit 48, through nozzle portions 40 and 42, into interior region 31, through tuyeres 34 and finally into bed 18. The fluidizing gas maintains particulate 18 in a fluidized state. The fluidizing gas can be air or other oxygen-containing gases.

Figure 4:
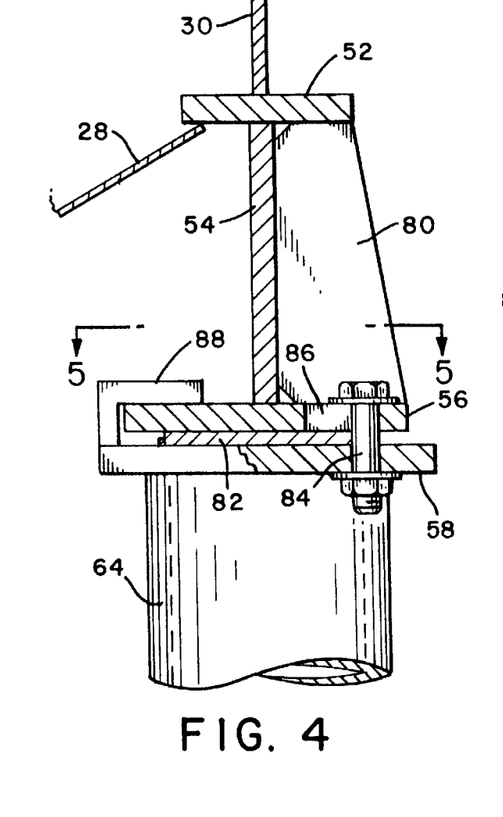
FIG. 4 is an enlarged view of one portion of a structure, shown in FIG. 3, for supporting the fluidizing gas distributor within the reactor.
Figure 4A:
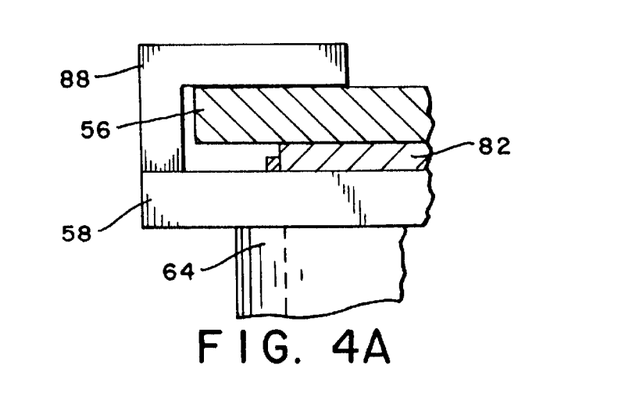
FIG. 4A is a partial, enlarged view of the seal configuration shown in FIG. 4.
Figure 5:
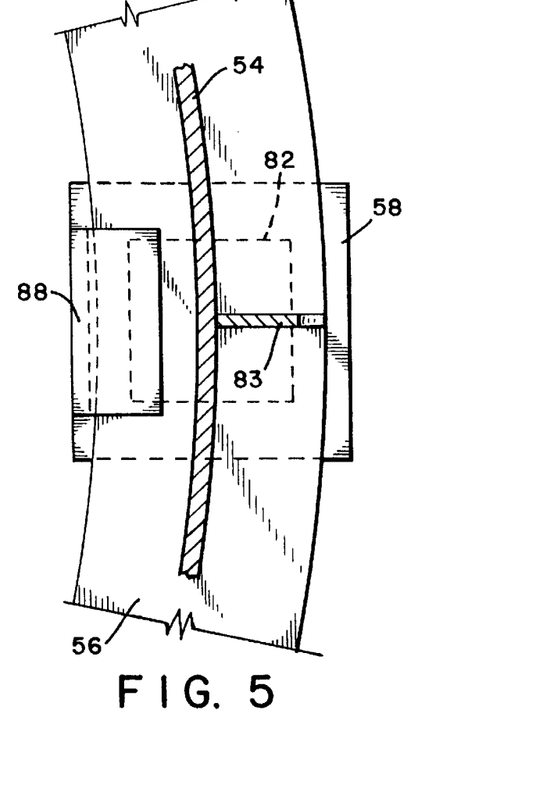
FIG. 5 is a view taken along line 5—5 of FIG. 4.
Figure 6:
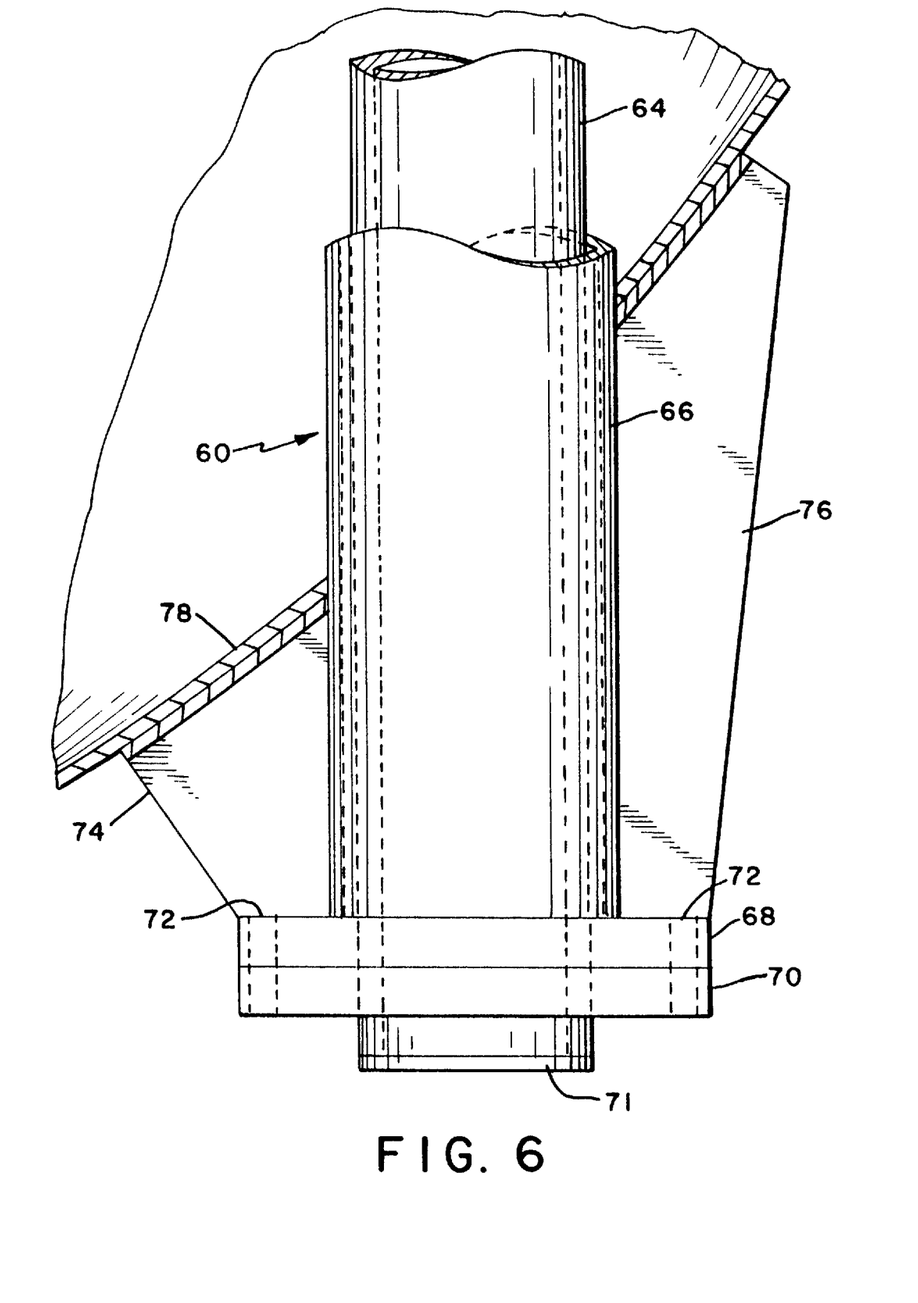
FIG. 6 is an enlarged view of another portion of the structure, shown in FIG. 3, for support the fluidizing gas distributor within the reactor.

Referring to FIGS. 3–6 and 8, distributor 24 is supported by a support structure that comprises circumferential wall 54, circumferential support plate 56, support plate 58 and equidistantly spaced stanchions or support members 60. Referring to FIG. 6, each support member 60 is comprised of cylindrical members 64, 66, flanges 68, 70 and base plate 72. Members 64 and 68 are preferably cylindrical in shape. Member 64 has a smaller diameter than member 68 thereby permitting member 64 to be telescopically disposed within member 66. Base plate 71 is rigidly attached to the end of member 64. Flanges 68 and 70 are rigidly attached to members 64 and 66, respectfully. Gussets 74 and 76 are attached between bottom wall 78 of reactor shell 12 and flange 68. Inlets 72 receive spring-loaded bolts (not shown) for resiliently fastening flanges 68 and 70 together. Support members 60 movably extend through bottom wall 78 of reactor. Thus, the spring-loaded bolts disposed in inlets 72 and the telescopic configuration of members 64 and 66 allow member 64 to move upward with respect to any upward movement of fluidizing gas distributor 24.

Referring to FIG. 4, circumferential wall 54 is perpendicularly attached to plates 52 and 56. Gusset plate 80 is attached to and between plates 52 and 56 to provide structural support. Plate 58 is rigidly attached to the top end of member 64. Expansion plate 82 is interposed between plates 56 and 58 and expands when it is heated. In a preferred embodiment, plate 82 is a Lubrite™ plate which is comprised of a steel plate coated with teflon. The purpose of plate 82 will be discussed below. FIG. 5 shows a plan view of expansion plate 82 in phantom. Gusset plate 83 is attached to circumferential wall 54 and annular plate 56 so as to provide structural support.

Referring again to FIG. 4, plates 56 and 58 are fastened together by bolt 84. Plate 56 has opening 86 therein which is substantially larger than the diameter of screw 84 thereby permitting two (2) dimensional shifting of plate 56 with respect to plate 58. Expansion plate 82 expands as annular plate 56 shifts thereby substantially reducing friction between annular plate 56 and plate 58.

One portion of substantially "L" shaped bracket 88 is attached to plate 58 and the other portion of bracket 88 is positioned over annular plate 56 so as to prevent any upward movement of annular plate 56 relative to plate 58 and to prevent excessive shifting of annular plate 56.

The telescopic arrangement of members 64 and 66, the spring loaded bolts fastening flanges 68 and 70 together, opening 86 in annular plate 56, expansion plate 82 and expansion joint 44 all cooperate to allow fluidizing gas distributor 24 to shift laterally as well as move upward with minimum mechanical stresses in response to variations in the temperature and pressure within and without distributor 24.

Figure 9:
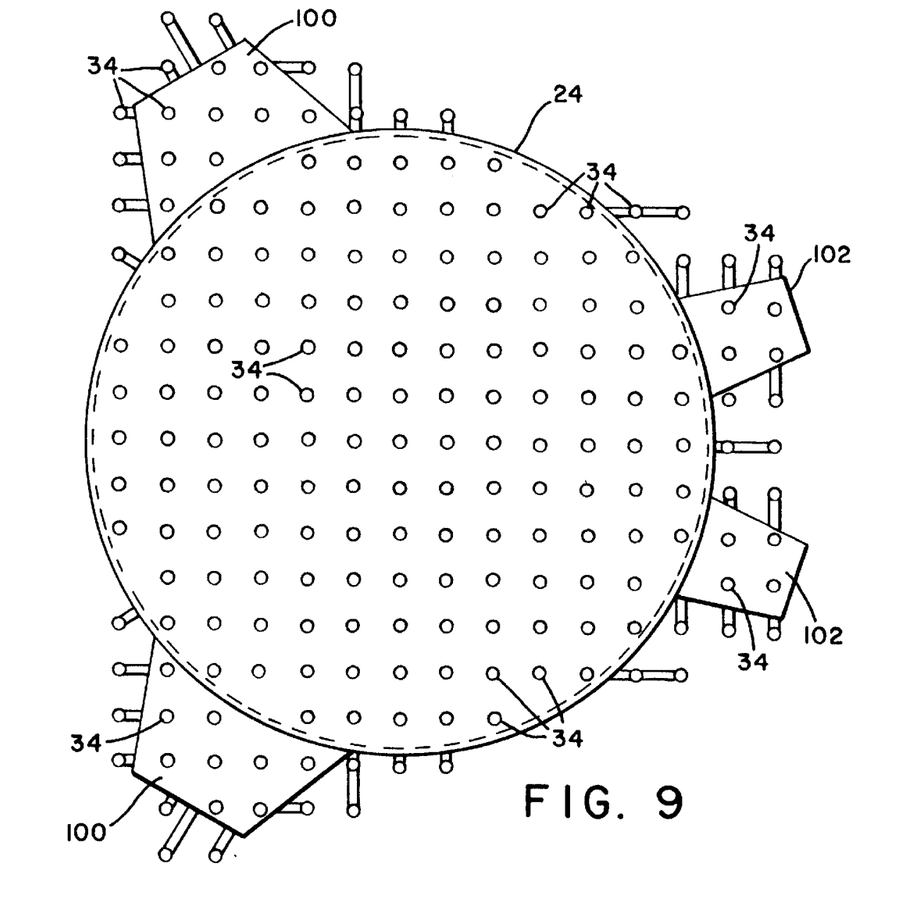
FIG. 9 is a view, similar to FIG. 8, which shows the gas distributor of the present invention having extensions attached thereto.
Figure 10A:
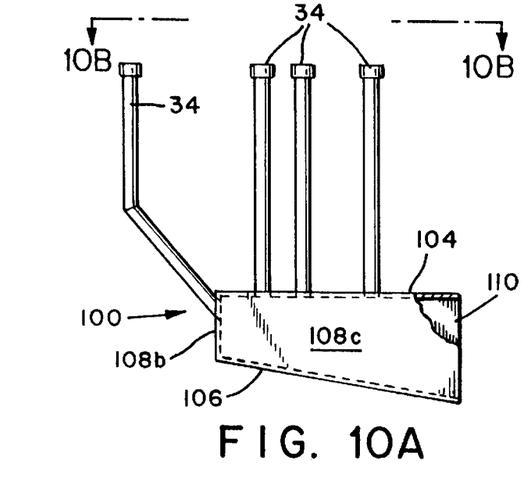
FIG. 10A shows a side elevational view of the extension shown in FIG. 9.
Figure 10B:
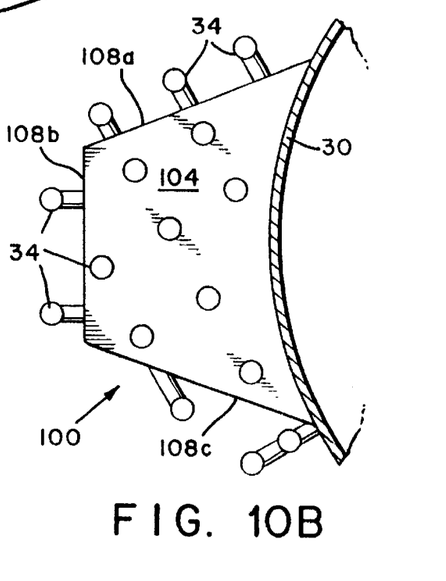
FIG. 10B is a view taken along line 10B—10B of FIG. 10A.
Figure 11A:
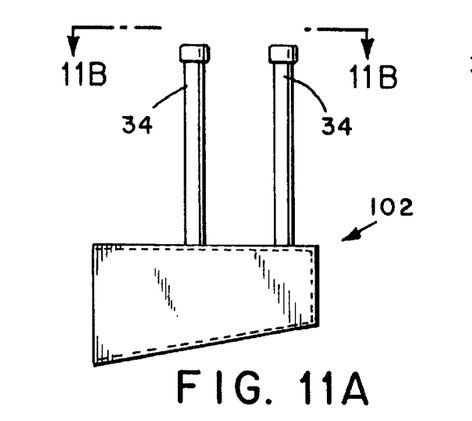
FIG. 11A shows a view, similar to FIG. 10A, of an alternate embodiment of the extension shown in FIG. 10A.
Figure 11B:
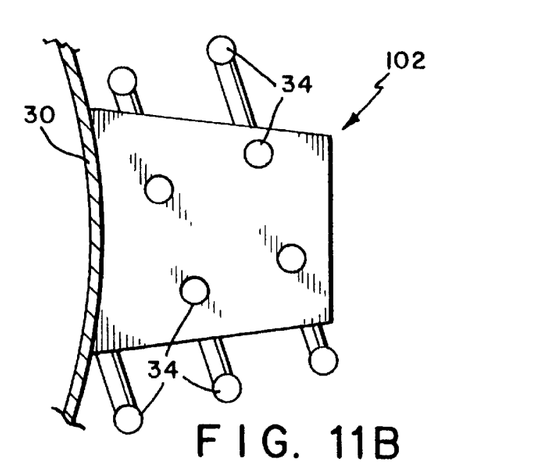
FIG. 11B is a view along line 11B—11B in FIG. 11A.

Referring to FIG. 9, there is shown a top plan view of fluidizing gas distributor 24 which includes extension boxes 100 and 102 operatively attached thereto. The extension boxes permit maximizing the use of the available space in the reactor in order to increase capacity of the reactor. FIGS. 10A and 10B show extension box 100 which is comprised of top portion 104, bottom portion 106 and sidewall sections 108a—c which are contiguous with top portion 104 and bottom portion 106. Top portion 104, bottom portion 106 and sidewall sections 108a—c define an interior region having an open end generally designated by the numeral 110. Extension box 100 further comprises tuyeres 34 attached to top portion 104 and provide gaseous communication between the bed of particulate and the interior of extension box 100. Extension boxes 102 are substantially structurally identical to extension boxes 100 except that boxes 102 are smaller in size than boxes 100. Extension boxes 100 and 102 are attached to distributor 24 such that open ends 110 and 112, respectively, are aligned with a corresponding openings in sidewall 30 thereby effecting gaseous communication between the interiors of the extension boxes and interior region 31 of distributor 24. Extension boxes 100 and 102 are aligned such that the bottom portions of each extension box are aligned with bottom portion 28 of distributor 24 so that and solid particulate can freely move from the bottom portion of the extension boxes to bottom portion 28 of distributor 24. The extension boxes may be of any shape that facilitates the utilization of the maximum amount of available space within the reactor.

Figure 2:
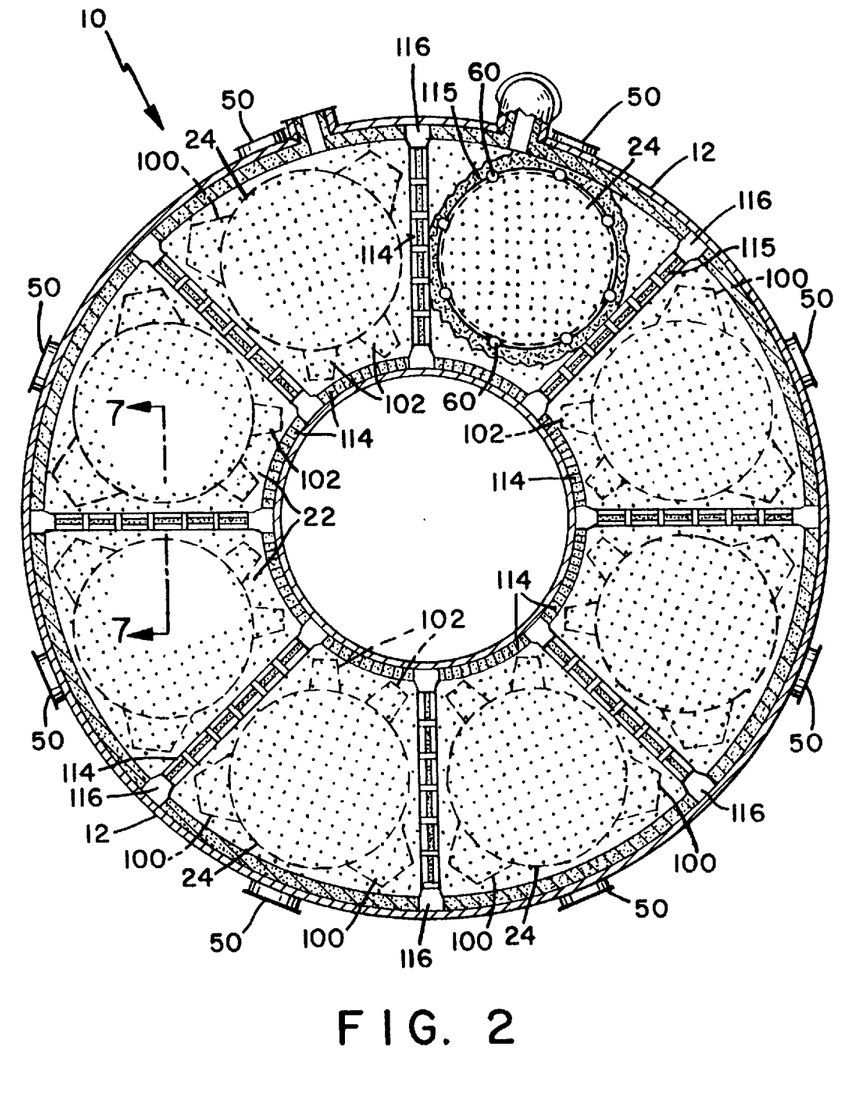
FIG. 2 is a top plan view of the reactor depicted in FIG. 1.

FIG. 2 shows a top plan view of fluidized bed reactor 10 of the present invention which uses a plurality of fluidizing gas distributors 24 arranged in a circular configuration. Each distributor 24 is associated with a corresponding reaction chamber defined by walls 114. Each distributor 24, nozzle assembly 32 and reaction chamber define a separate reactor subsystem, e.g. subsystems 27a and 27b shown in FIG. 1. FIG. 2 also illustrates the positioning of extension boxes 100 and 102 to utilize the maximum amount of space in reactor 10.

In an alternate embodiment, fluidized bed reactor 10, as shown in FIG. 2, uses a plurality of fluidizing gas distributors 24 arranged in a circular configuration wherein each distributor 24 has a toroidal shape.

Figure 7:
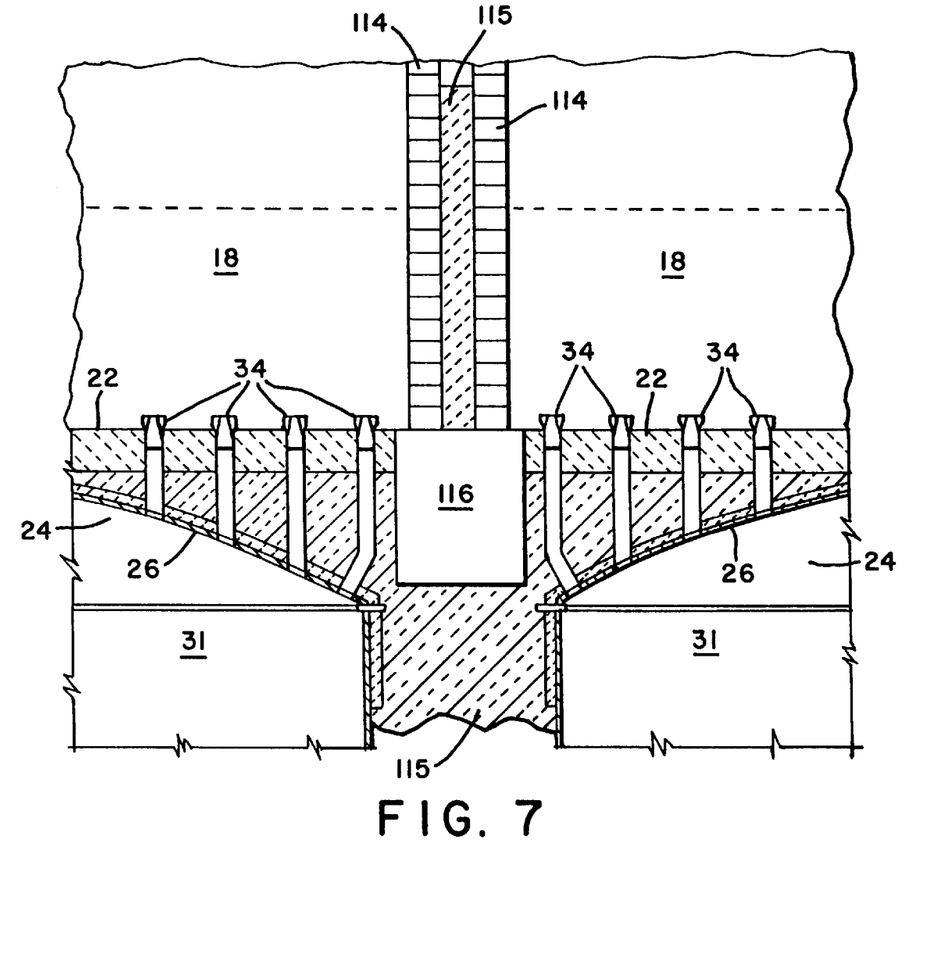
FIG. 7 is a view taken along line 7—7 of FIG. 2.
Figure 8:
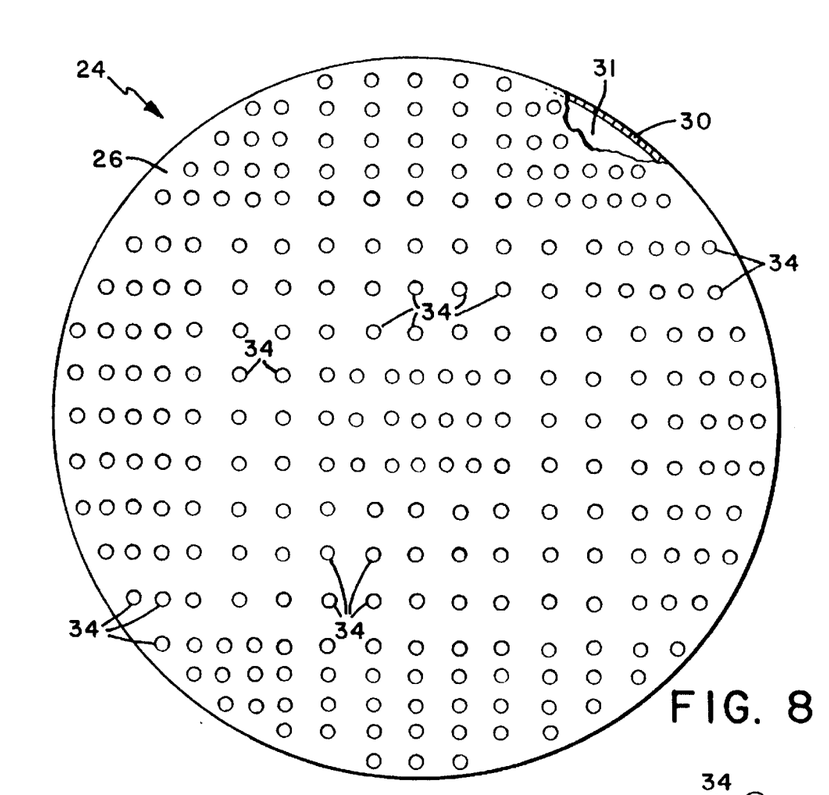
FIG. 8 is a view taken along line 8—8 of FIG. 3.

Referring to FIGS. 1 and 7, each reactor subassembly is separated from an adjacent reactor subassembly by insulation 115 and arches 116. Insulation 115 is preferably a concrete based insulation. System 27b is shown in FIG. 1 without distributor 24 to clearly show one of the arches 116. Each arch 1 16 is preferably made of a refractory material as described above. Arches 116 support bricks 114, as shown in FIG. 7, which contain the beds of particulate 16.

Referring to FIG. 3, each reactor subsystem includes labyrinth-type seal 120 that is attached to the underside of plate 58 and extends downward into telescoping member 64. Seal 120 prevents particles of insulation from penetrating interior region 122 below bottom portion 28 of distributor 24.

Drain 29 is formed in lower portion 78 of reactor shell 12 and permits the drainage of any particles of insulation or any particulate of bed 18 that enter interior region 122.

Thus, the present invention provides an improved fluidized bed reactor that utilizes a plurality distributors 24 positioned to produce a bed having a specific shape that is independent of the shape of the reactor. Therefore, the arrangement of the distributors 24 within the reactor may be that of any pattern, e.g. round, annular, circular etc. Such a feature also facilitates maximizing the utilization of available space within the reactor and avoids the problems of expansion, deformation, warping sealing, etc. which typically accompany large conventional metallic distributors when heated. As shown above, the improved fluidized bed reactor avoids the problems of high mechanical stress, diameter limitations, differential pressure limitations typical of refractory domes and makes possible the construction of very large diameter fluidized bed reactors with a high pressure drop across the tuyeres.

The pressure drop across tuyeres 34 represents the operating relative pressure of the distributor. The pressure drop is only limited by the tolerable stresses in the containing walls of the distributor 24. A plurality of distributors of smaller size permit relatively higher pressure drops, all other conditions being equal.

The shape and size of the distributor 24 and the location of the distributor within reactor shell 12 may be configured to the specific dimensions of a particular reactor. Each distributor may have a size or shape that is different than of that the reactor containing the distributor. Furthermore, the reactor diameter and mechanical design in general is not effected or limited by the requirements of distributor 24. Each distributor can have a shape other than round. For example, each distributor 24 may have a shape that is substantially spherical, bubble, rectangular, trapezoidal etc.

The bottom portion of each distributor is profiled so as to allow draining by gravity of any granule solids, i.e., insulation particles of particulate of bed 18, etc. Expansion joints may be used to attach each distributor to reactor shell 12 so as to allow movement of each distributor with respect to variations in temperature and pressure during the operation of the reactor. As described above, each distributor can freely expand in the reactor. Thus, no forces, except for the weight of the distributor, are transmitted to the reactor shell or the refractory lining.

When a plurality of distributors 24 are used, the distributors radially expand with respect to reactor shell 12, starting from the vertical center line of the distributor and normally coinciding with the inlet gas nozzle, rather than from the reactor vertical center line. Such a configuration facilitates expansion of the distributors with respect to the reactor shell in response to variations in temperature and pressure during the operation of the reactor.

Furthermore, distributors 24 can be mutually arranged in the reactor 10 so as to produce an overall pattern to comply with a specific bed shape, in particular, a toroidal shape. The distributors are mutually arranged in such a manner as to permit installation, between adjacent distributors, of vertical baffles so as to separate the fluid bed into a number of individual cells.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A fluidized bed reactor composing:
   a reactor shell;
   at least one reactor subsystem positioned within the shell, and having a reaction chamber and a wall
   at least one fluidizing gas distributor positioned below the reaction chamber and supported by the wall, the distributor comprising a top portion, a bottom portion, and a sidewall contiguous with the top and bottom portions to define an interior;
   a plurality of tuyeres attached to the top portion of the distributor to provide gaseous communication between the reaction chamber and the interior, and an inlet in the bottom portion for introducing a fluidizing gas to the interior;
   a fluidized bed support structure including:
      a first portion having a plurality of telescoping members extending from the fluidizing gas distributors;
      a second portion having a plurality of support members extending from the reactor shell, each support member being adapted to telescopically receive a respective one of the plurality of telescoping members, such that the fluidizing gas distributor is movable relative to the support members in response to variations in temperature and pressure; and
      a seal attached to the first portion and operatively associated with the second portion of the support structure, the wall and the bottom portion of the distributor defining a lower interior region of the reactor subsystem, the seal preventing particles from entering the lower interior region.

2. The fluidized bed reactor as set forth in claim 1 wherein the inlet comprises a nozzle in gaseous communication between the interior and a fluidizing gas source.

3. The fluidized bed reactor as set forth in claim 2 wherein the nozzle comprises a first nozzle portion, a second nozzle portion coaxial with the first nozzle portion and an expansion joint interposed between the first and second nozzle portions to allow each nozzle portion to move freely of the other portion.

4. The fluidized bed reactor as set forth in claim 3 wherein the nozzle is vertically oriented such that the first nozzle portion is above the second nozzle portion, the nozzle further comprising an opening formed in the lower nozzle portion and coaxial with the second nozzle portion, the opening in the second nozzle portion permitting drainage of solid particulate.

5. The fluidized bed reactor as set forth in claim 4 wherein the bottom portion is substantially conical in shape and the inlet is formed in the apex of the bottom portion, the inlet being sealingly and gaseously connected to the first nozzle portion and aligned with the opening in the second nozzle portion whereby solid particulate travels upon the bottom portion, falls through the inlet and then is discharged through the opening in the second nozzle portion.

6. The fluidized bed reactor as set forth in claim 3 wherein the second nozzle portion has an opening in communication with the fluidizing gas source.

7. The fluidized bed reactor as set forth in claim 2 wherein the bottom portion is substantially conical in shape and the inlet is formed in the apex thereof, the nozzle being sealingly and gaseously connected to the inlet.

8. The fluidized bed reactor as set forth to claim 1 wherein the seal is a labyrinth seal.

9. The fluidized bed reactor as set forth in claim 1 wherein the improvement further comprises at least one gas distributor extension positioned within the reactor shell and connected to the fluidizing gas distributor, the extension comprising a top portion, a bottom portion, a sidewall contiguous with the top portion and the bottom portion so as to define an interior, a plurality of tuyeres attached to the top portion of the extension and in gaseous communication between the interior of the extension and the reaction chamber, the extension being connected to the gas distributor in a manner such that the interior of the extension is in communication with the interior of the distributor and solid particulate freely travels from the extension bottom portion to the distributor bottom portion.

10. The fluidized bed reactor as set forth in claim 1 wherein the improvement further comprises a plurality of fluidizing gas distributors arranged in a substantially circular formation.

11. The fluidized bed reactor as set forth in claim 1 wherein the improvement further comprises the fluidizing gas distributor having a substantially toroidal shape.

12. The fluidized bed reactor as set forth in claim 1 wherein the fluidizing gas distributor is fabricated from metal.

13. The fluidized bed reactor as set forth in claim 1 wherein the improvement further includes a support member attached to the reaction chamber and positioned intermediate the distributor top portion and the reaction chamber, the support member having a plurality of openings for receiving corresponding tuyeres of the distributor.

14. The fluidized bed reactor as set forth in claim 1 wherein the improvement further comprises an insulating material intermediate the fluidizing gas distributor and the reaction chamber.

15. The fluidized bed reactor as set forth in claim 1 wherein the improvement further comprises the distributor having a substantially spherical shape.

16. A fluidized bed reactor comprising:
   A reactor shell and at least one reactor subsystem within the shell, the reactor subsystem having a reaction chamber and a wall;

at least one fluidizing gas distributor positioned beneath the reaction chamber, the distributor comprising:
a top portion, a bottom portion and a sidewall contiguous with the top portion and the bottom portion to define an interior, the bottom portion having an inlet formed therein for introducing a fluidizing gas to the interior,
a plurality of tuyeres attached to the top portion of the distributor for providing gaseous communication between the reaction chamber and the distributor interior,
a nozzle in gaseous communication with the inlet in the bottom portion for introducing a fluidizing gas to the distributor interior;

a support structure having a first portion attached to the distributor and a second portion rigidly attached to the wall of the reactor chamber, the first portion being movable with respect to the second portion to allow the fluidizing gas distributor to move in response to variations in temperature and pressure within the reactor subsystem; and
a seal attached to the first portion and operatively associated with the second portion of the support structure, the wall and the bottom portion of the distributor defining a lower interior region of the reactor subsystem, the seal preventing particles from entering the lower interior region.

* * * * *